(12) United States Patent
Bartholoma et al.

(10) Patent No.: US 6,722,704 B2
(45) Date of Patent: Apr. 20, 2004

(54) CONNECTING FITTING WITH AN ELASTIC RING AS A STOP

(75) Inventors: Mario Bartholoma, Winden (DE); Fritz Zugel, Waldkirch (DE); Volker Gotz, Kenzingen (DE); Philipp Gerber, Gutach-Bleibach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 10/258,981

(22) PCT Filed: May 12, 2001

(86) PCT No.: PCT/EP01/05909

§ 371 (c)(1), (2), (4) Date: Oct. 30, 2002

(87) PCT Pub. No.: WO02/03520

PCT Pub. Date: Jan. 10, 2002

(65) Prior Publication Data

US 2003/0090105 A1 May 15, 2003

(30) Foreign Application Priority Data

Jul. 1, 2000 (DE) .......................... 100 32 010

(51) Int. Cl.⁷ .......................... F16L 35/00; H02G 3/06
(52) U.S. Cl. .................. 285/140.1; 285/210; 285/207
(58) Field of Search .................. 285/139.1, 139.2, 285/140.1, 141.1, 209, 210, 207

(56) References Cited

U.S. PATENT DOCUMENTS

| | | | | |
|---|---|---|---|---|
| 2,472,569 A | * | 6/1949 | Caldwell | 285/210 |
| 2,759,743 A | * | 8/1956 | Bloom | 285/119 |
| 3,003,795 A | * | 10/1961 | Lyon | 285/212 |
| 3,139,768 A | * | 7/1964 | Biesecker | 74/502.4 |
| 3,275,348 A | * | 9/1966 | Scott | 285/212 |
| 4,150,836 A | * | 4/1979 | Walker | 277/638 |
| 4,531,767 A | * | 7/1985 | Andreolla | 285/220 |
| 4,570,983 A | * | 2/1986 | Olenfalk et al. | 285/355 |
| 6,179,340 B1 | * | 1/2001 | Adolf et al. | 285/140.1 |
| 6,283,510 B1 | * | 9/2001 | Bartholoma et al. | 285/184 |
| 6,394,690 B1 | * | 5/2002 | Bartholoma et al. | 403/290 |
| 6,511,099 B2 | * | 1/2003 | Bartholoma al. | 285/140.1 |
| 2002/0006309 A1 | * | 1/2002 | Bartholoma et al. | 403/194 |

FOREIGN PATENT DOCUMENTS

| | | |
|---|---|---|
| DE | 4325420 | 2/1995 |
| EP | 0790453 | 8/1997 |
| EP | 0935087 | 8/1999 |

* cited by examiner

Primary Examiner—Eric K. Nicholson
(74) Attorney, Agent, or Firm—Volpe and Koenig, P.C.

(57) ABSTRACT

A connecting fitting used for fixing longitudinal bodies to perforations or openings, especially in the wall of a housing, which include retaining projecting elements that engage with the edge of the perforation from the rear, and a stop in the form of a plastic ring which, in use, lies on a side of the opening opposite the edge of the opening that is engaged from the rear. The elastic ring is supported by a surface of the connecting fitting which expands from an area adjacent the opening from inside toward outside in an oblique manner, whereby the ring can be moved and displaced axially when the diameter is elastically enlarged, in order to account for different wall thicknesses. In order to compensate for even greater differences in wall thicknesses, the connecting fitting, adjacent to the region of the oblique surface, is divided into a separate part which include the oblique surface that is displaceable on the connecting fitting in an axial direction, whereby the axial distance of the oblique surface to the retaining projecting elements can be modified or selected, thereby allowing for at least approximate adaptation to various wall thicknesses.

8 Claims, 3 Drawing Sheets

CONNECTING FITTING WITH AN ELASTIC RING AS A STOP

BACKGROUND

The invention concerns a connecting fitting for fixing longitudinal bodies such as tubing, corrugated tubing, pipes, cables or other such things to an opening, especially to a perforation or punch hole, for example, in a wall of a housing or some such surface, whereby the connecting fitting features a fastening projection which protrudes axially in the direction of insertion, which is divided, essentially, into holding tongues by slots that extend in the axial direction. On the outside of these tongues, at least when in use, there are retaining projecting elements that project radially outwardly, so that when the fastening projection is pushed into the opening, the holding tongues achieve a holding position behind the edge of the opening (perforation or similar hole), in that they at least partially extend behind this edge. A stop is also situated at a distance from the retaining projecting elements. When in use, this stop lies on the edge of the opening opposite the edge of the opening which is engaged from the rear. The stop is formed of an elastic or elastic rubber ring which is supported by an oblique surface of the connecting fitting which expands from the opening from the inside to the outside in an oblique manner, whereby the ring can be moved and displaced, because of its elastic reset ability, in the axial direction when the diameter is elastically enlarged.

This type of connecting fitting is already known from the German Patent DE 198 04 719 C1, and has been proven useful, because it can be used on openings, holes, or perforations of housing walls with differing wall thicknesses, whereby the elasticity of the ring forming the stop is utilized for adjusting to differing wall thicknesses, since this ring is supported on one of the surfaces of the connecting fitting expanding away from the opening and can be more or less displaced, depending on the thickness of the wall, by the elastic enlargement of its diameter.

However, the greatest possible wall thickness is limited to the distance between the beginning of the oblique surface and the retaining projecting elements that extend behind the opening in the wall. Moreover, an elastic ring with a relatively large cross section must be used in consideration of relatively thin wall thicknesses, which also makes a greater displacement ability necessary for use with relatively large wall thicknesses. In addition, an elastic ring with a larger cross section also means higher costs.

SUMMARY

The object of the invention is therefore to provide a connecting fitting of the type defined in the introduction, whereby rings with a smaller cross section can be used as stops, therefore also enabling the fitting to be used with greater wall thicknesses.

As a solution to this seemingly contradictory task, a connecting fitting is provided that is divided into separate parts adjacent to the region with the oblique surface and/or in the region of the largest diameter of the oblique surface; the separate part with the oblique surface on the connecting fitting can be displaced in the axial direction, enabling the axial distance of the oblique surface from the retaining projecting elements to be modified or selected.

In this way, it is possible to allow for a wall thickness in the region of a perforation of the housing to be engaged from behind in such a way that an elastic ring with a relatively small cross section is sufficient to achieve the desired fastening. This elastic ring, an O-ring for example, can be correspondingly inexpensive. In addition, above all, there is no large displacement force exerted on the elastic stop ring, even with large wall thicknesses, which can also be allowed for by the displacement of the part with the oblique surface.

Additionally, even larger wall thicknesses can be engaged without problems, due to the possibility of displacing the part with the oblique surface opposite the connecting fitting in an axial direction.

It is especially convenient if the separate part with the oblique surface can be displaced in the axial direction, and then also immobilized by means of turning on a screw threading. In this way, an infinitely variable adjustment to different wall thicknesses can be achieved. For fixing the position, the self stopping action of the screw threading, especially in conjunction with the elastic ring or O-ring, is sufficient in most cases.

The part with the oblique surface can be a ring which has internal screw threading over at least part of its axial length, and which fits onto an outer screw thread on the connecting fitting. This makes it possible to achieve a simple axial displacement by turning this ring, which then can also adjust the elastic ring correspondingly.

The part with the oblique surface can have a ring area located adjacent to the oblique surface in an axial direction, situated at a further distance from the retaining projecting elements than from the oblique surface when in use. This ring area can be constructed as a gripping ring for turning and/or provided with indentations for grasping it by hand or, if necessary, by a tool. It is therefore especially conducive to ease of use if the area with the oblique surface is divided up, with some distance from the end of the oblique surface, i.e. from the area with the largest diameter opposite the connecting fitting, so that a gripping ring is also formed at the same time, allowing the part with the oblique surface or the ring to be comfortably grasped and turned for fastening together.

A modified version of the invention can be constructed in which the part with the oblique surface or the ring can be axially displaced in stages and can be immobilized by means of a detachable bolting device, e.g. with a cross pin that fits into cross perforations of the part or ring and the connecting fitting. Since the elastic ring serving as a stop can adapt to differences in wall thickness at the perforation in the housing, spaced-apart or graduated displacements and immobilizations of the separate part with the oblique surface can suffice for adapting to large differences in wall thickness without any problem. The use of screw threads can thus be avoided.

In a preferred embodiment according to the invention, the cross pin can be constructed as a bolt, whereby the pin itself is correspondingly well secured in its locked position. The number of cross perforations depends, then, on the overall differences in wall thickness in the area of a housing perforation that the device is supposed to be able to bridge.

For the sake of completeness, it should be mentioned that the connecting fitting can be provided with another screw threading for a collet, so that a collet with clamps can be situated inside the connecting fitting and operated in a self-evident manner, e.g. for immobilizing a cable.

BRIEF DESCRIPTION OF THE DRAWINGS

Preferred embodiments of the invention are described in more detail on the basis of the attached drawings.

In the drawings.

DETAILED DESCRIPTION OF THE PREFERRED EMBODIMENTS

In the following descriptions of preferred embodiments of the invention, parts corresponding to each other with regard to their function, but modified in their design or version, are designated with the same reference number.

A connecting fitting designated as a whole with 1 is used for fixing longitudinal bodies, in the described embodiment for fixing a body that is essentially smooth on the outside, such as a cable, to an opening 3, such as a perforation or a hole, in a wall 4 of a housing or some such similar object. The longitudinal body or cable is not drawn in for the sake of a better view.

Figure 1:
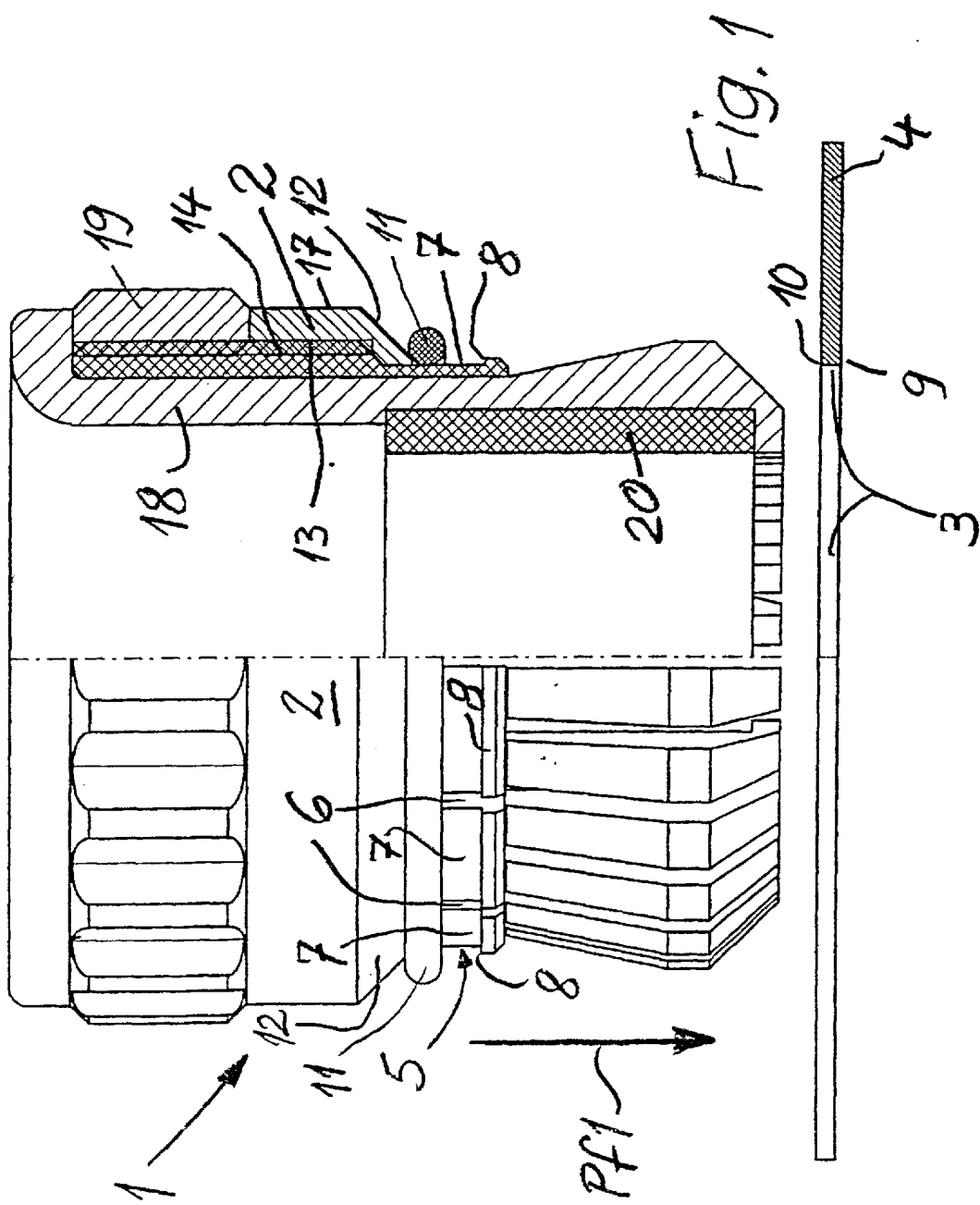
FIG. 1 is a partial side view of a longitudinal section of the connecting fitting in accordance with the invention which is subdivided in the area with an oblique surface, in particular by a screw thread of the type allowing the part with the oblique surface to be displaced opposite the connecting fitting by turning, before assembly.

The connecting fitting 1 includes a fixing projecting element 5 that extends in the axial direction of insertion, indicated by the arrow PF1 in FIG. 1, which is divided into holding tongues 7 by the slots 6 that extend in the axial direction. On the outside of these holding tongues, there are retaining projecting elements 8 projecting in radially outwardly. These retaining projecting elements go into the opening 3 when the fixing projecting element 5 is pushed in, thereby pushing the holding tongue 7 behind the edge 9 into its holding position in accordance with FIGS. 2 through 5, so that the retaining projecting elements 8 reach behind this edge 9. This gives them a somewhat sawtooth-like cross section, i.e., their height increases in the opposite direction of insertion by degrees up to the greatest radial dimension, and then decline relatively abruptly within a radial plane, so that, in use, this abrupt decline forms a working connection with the edge of the hole 9.

At a distance from the retaining projecting elements 8 and their abrupt stopping surface is a stop which is described in more detail hereafter, and which, when in use, lies on the edge of the opening 10 which lies opposite the edge 9 of the opening 3, which is gripped from behind, as shown in FIGS. 2 through 5.

The previously mentioned stop is a rubber elastic ring 11, preferably an O-ring, and, according to FIGS. 2 through 5, is positioned immediately on the edge of the opening 10 and supported on a surface 12 that expands from the inside towards the outside obliquely as it extends away from the opening 3. The stop, as a whole, is therefore formed by this oblique surface 12 and the elastic ring 11 positioned on it.

Compared to an initial position, as in FIG. 1, the ring 11, because of its position, can be displaced in the axial direction by the enlargement of its diameter in opposition to a reset force on the oblique surface 12, and can therefore be somewhat spread out, but may also be somewhat condensed at the same time.

Figure 2:
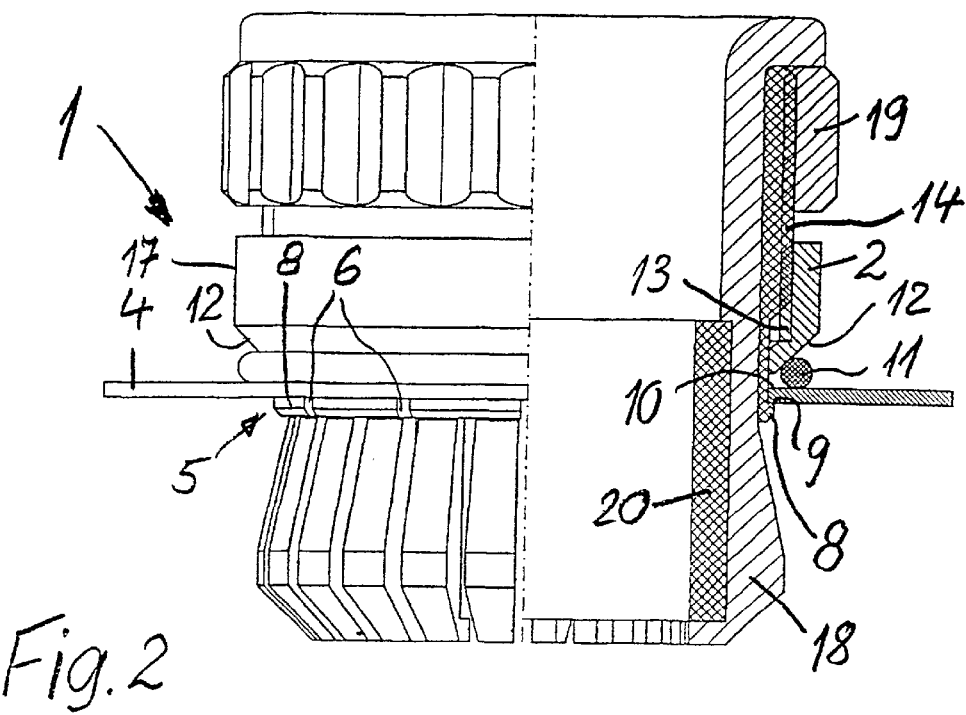
FIG. 2 is a view similar to FIG. 1, shown after assembly, in which the connecting fitting is attached to a relatively thin wall and the part with the oblique surface with the elastic ring acting as a stop is therefore displaced closer to the retaining projecting elements.
Figure 4:
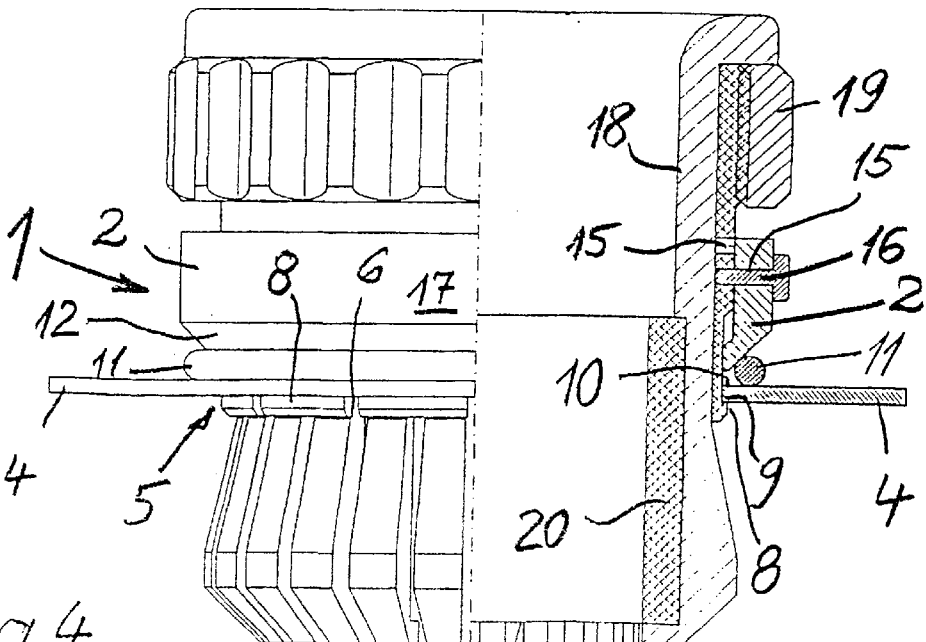
FIG. 4 is a view similar to FIG. 2 in which the part with the oblique surface or the ring can be displaced in steps and immobilized in any position by means of a cross pin, thus enabling its use with a relatively thin wall.

Compared to FIGS. 2 and 4, just such a greater axial displacement of the ring 11 forming the abutment will result if the thickness of the wall 4 is greater than in the illustrations named, so that because of the elasticity of the ring 11 and the oblique surface 12, whose smallest diameter can encroach a little into the ring 11, an automatic adaptation to differing thicknesses of the wall 4 is possible. If the wall 4 is thicker, however, then the connecting fitting must be stuck into the opening 3 with greater force, until the retaining projecting elements 8 achieve a position behind the edge 9, which is then gripped from behind, and are fixed there. In this case, the ring 11 is then correspondingly deformed to a greater degree and expands over the oblique surface 12 whenever it is axially displaced relative to this oblique surface 12.

Figure 3:
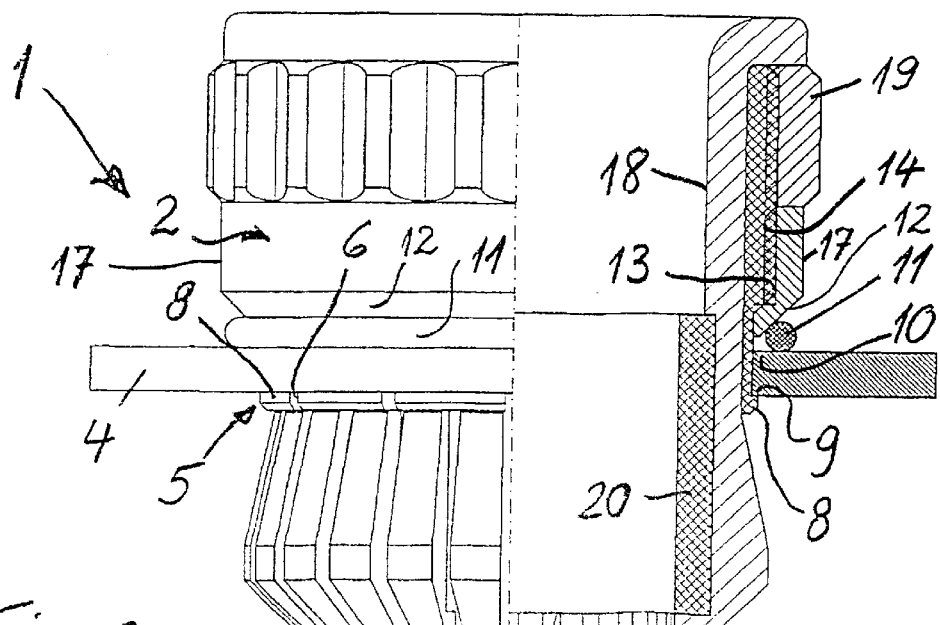
FIG. 3 is a view similar to FIG. 2 in which a wall with greater thickness is provided and, accordingly, the part with the oblique surface is displaced in the axial direction further from the retaining projecting elements.
Figure 5:
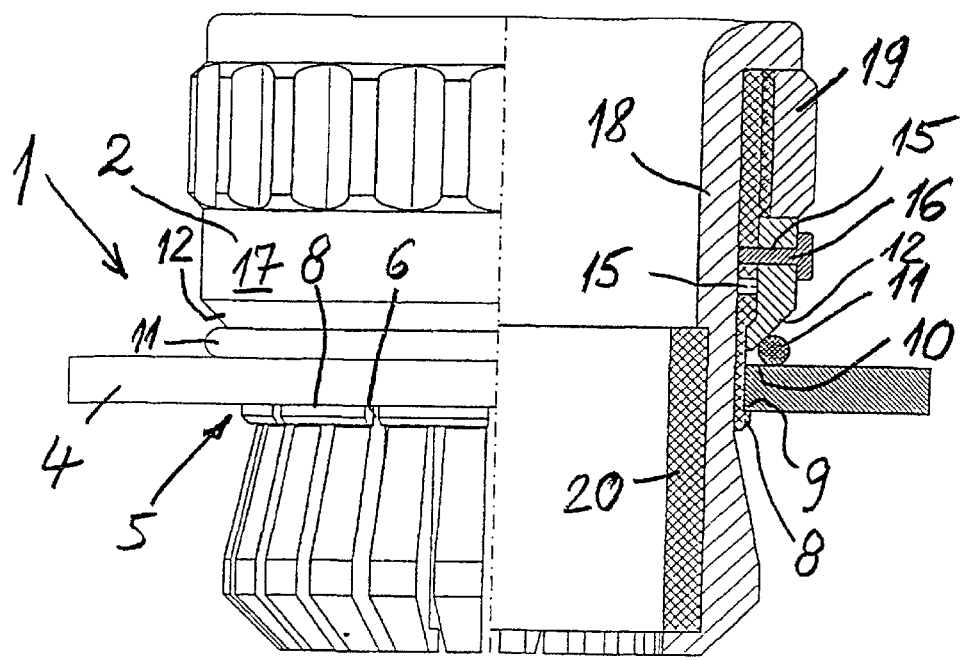
FIG. 5 is a view similar to FIG. 4 with an alternate embodiment of the invention in which the connecting fitting engages a relatively thick wall and the part with the oblique surface is secured by a cross pin and perforations in one of the positions further from the retaining projecting elements.

So that significantly greater differences in the thickness of the wall 4 are made possible, as illustrated by comparing FIG. 2 with FIG. 3 on the one hand and by comparing FIG. 4 with FIG. 5 on the other hand, the connecting fitting 1 adjacent to the area with the oblique surface 12 is divided up, and the separate part 2 with the oblique surface 12 can be displaced on the connecting fitting 1 in the axial direction, as clearly illustrated by comparing FIGS. 2 and 3 in relation to 4 and 5. In this way, the axial distance of the oblique surface 12 or its origin from the retaining projecting elements 8 can be altered and selected, i.e., a rough adjustment to the wall thickness in question can be performed from the outset, so that the elastic stop ring 11 only needs to be subjected to a small deformation in order to achieve a precise adaptation to the respective wall thickness. Because of this, a ring 11 that is relatively smaller in diameter can suffice for this adaptation, and the deforming force to which it is subjected then also remains small if a relatively large wall thickness is present at the opening 3. In FIGS. 2 and 3 on the one hand and in FIGS. 4 and 5 on the other hand, it can be clearly seen that the ring 11 must bridge a comparatively consistent distance between the oblique surface 12 and the outside of the wall 4 in spite of differing wall thicknesses in each case because the part 2 with the oblique surface 12 had already been essentially adapted beforehand to the expected wall thickness. Nevertheless, the advantage of an elastic stop ring 11 which can balance out inexactness and differences in thickness is maintained.

In FIGS. 1 through 3, an embodiment of the invention is shown in which the part 2 with the oblique surface 12 can be displaced by a screw thread by turning it in the axial direction and can be secured by the self-securing property of this screw threading as well as by the friction on the elastic ring 11. In this case, the part 2 with the oblique surface 12 is a ring, which has an inner screw threading 13 over a part of its axial extension, which fits onto an outer screw threading 14 on the connecting fitting 1 in the region of the common plane of separation. In FIG. 1, this part 2 bolts together in the axial direction in its upper end position, i.e. the position the furthest away from the retaining projecting elements 8, while FIG. 2 illustrates a screw connection in the opposite direction with a corresponding decrease in the distance to the retaining projecting elements 8. In this position, as shown in FIG. 2, a part of the inner screw threading of the ring-shaped part 2 has therefore vacated the outer screw threading 14 of the connecting fitting 1.

In the embodiment of the invention shown in FIGS. 4 and 5, the part 2 with the oblique surface 12 can be displaced in graduated steps and can be secured by a movable bolting device, that is to say, with at least a cross pin 16 that fits into cross perforations 15 of the part 2 and the connecting fitting 1. This cross pin can also, if necessary, be constructed as a bolt so that it is, self secured. In FIGS. 4 and 5, two cross perforations 15 across from each other in the axial direction on the connecting fitting 1 can be recognized. In this case, there are two adjustment positions possible for differing thicknesses of the wall 4. Wall thicknesses lying in between these can be adjusted to by the elasticity and differing degree of deformation of the ring 11, as well as a possible displacement on the oblique surface 12.

In both embodiments of the invention, the part 2 with the oblique surface 12 has a ring region 17 which is located adjacent to the oblique surface 12 in the axial direction, and, when in use, at a distance further from the retaining projecting elements 8 than from the oblique surface 12, and which, in the version of the invention in FIGS. 2 and 3, is constructed as a gripping ring for turning, and which can be grasped by hand or, if needed, with a tool, in order to turn it. In the version of the invention illustrated in FIGS. 4 and 5, the cross perforations 15 for the cross pin 16 are located in this ring region 17.

Since in this ring region 17, a single cross perforation 15 is sufficient and the adjacent cross perforations running in the axial direction are located in the connecting fitting 1, a relatively more narrow ring region 17 can suffice.

In both embodiments of the invention, a collet 18 belonging to this device can be provided, which is located on the inside of the connecting fitting 1, and which, with the help of a screw housing 19, can be placed in the axial direction, in order to press a gasket 20 against a longitudinal body to be secured, and to securely fasten this in the region of the connecting fitting.

The connecting fitting 1 for fixing longitudinal bodies to perforations or openings 3, especially the wall 4 of a housing, comprising retaining projecting elements 8 engaging with the edge 9 of a perforation 3 from the rear and a stop embodied in the form of an elastic ring 11 from the rear. When in use, this stop lies against the edge of the opening 10 opposite the edge 9 of the opening 3, which is gripped from the rear. The elastic ring 11 is supported by a surface 12 of the connecting fitting 1 that expands obliquely from inside to outside as it extends away from the opening 3, so that the elastic ring can be displaced and moved in the axial direction by elastic enlargement of its diameter, in order to adapt to differing wall thicknesses. So that yet greater differences in wall thicknesses can be adapted to, the connecting fitting 1 adjacent to the region with the oblique surface 12 is divided up, and the separate part 2 with the oblique surface 12 can be displaced in the axial direction on the connecting fitting 1, whereby the axial distance of the oblique surface 12 from the retaining projecting elements 8 can be altered or selected, and is therefore at least roughly adaptable to differing wall thicknesses.

What is claim is:

1. A connecting fitting (1) for fixing longitudinal bodies to an opening (3) in a wall (4) of a housing or surface, the connecting fitting (1) comprising a fastening projection (5) which protrudes axially in a direction of insertion (PF1), which is divided into holding tongues (7) by slots (6) that extend in the axial direction, retaining projecting elements (8) that project radially outwardly located on an outside of the holding tongues, so that in use upon the fastening projection (5) being pushed into the opening (3), the holding tongues (7) engage in a holding position behind an edge (9) of the opening (3) in which the retaining projecting elements at least partially reach behind the edge (9), a stop located on the fitting at a distance from the retaining projecting elements (8) which, in use, lies on an edge of the opening (3) opposite the edge (9) of the opening (10), which is engaged from behind, the stop being formed of an elastic or elastic rubber ring (11), which is supported by an oblique surface (12) of the connecting fitting (1) which expands from a position adjacent the opening from inside to outside in an oblique manner, and which can be moved and displaced due to its elastic reset ability on the oblique surface (12) in the axial direction so that a diameter thereof is elastically enlarged, the fitting being divided to form a separate part in a region with the oblique surface (12) and/or in the region of the greatest diameter of the oblique surface (12), the separate part (2) with the oblique surface (12) being displaceable on the connecting fitting (1) in the axial direction so that an axial distance of the oblique surface (12) from the retaining projecting elements (8) can be altered or selected.

2. A connecting fitting according to claim 1, wherein the separate part (2) with the oblique surface (12) can be displaced in the axial direction and is secureable via turning on a screw threading.

3. A connecting fitting according to claim 1, wherein the separate part (2) with the oblique surface (12) is a ring which has an inner screw threading (13) over at least part of an axial extension thereof, and which fits onto an outer screw threading (14) on the connecting fitting (1).

4. A connecting fitting according to claim 1, wherein the separate part (2) with the oblique surface (12) has a ring region (17) adjacent to the oblique surface (12) in the axial direction, which is located further from the retaining projecting elements (8) than from the oblique surface (12) when in use, and which is constructed as a gripping ring for turning and/or provided with depressions for gripping.

5. A connecting fitting according to claim 1, wherein the separate part (2) with the oblique surface (12) is displaceable in graduated steps in the axial direction and is securable via a movable bolting device having a cross pin (16) that fits into a cross perforation (15) in the separate part (2) and the connecting fitting (1).

6. A connecting fitting according to claim 5, whereim several cross perforations (15) are provided on the connecting fitting in the axial direction and one cross perforation is provided on the part (2).

7. A connecting fitting according to claim 5, wherein the cross pin (16) is constructed as a bolt.

8. A connecting fitting according to claim 1, wherein the part (2) with the oblique surface (12) has a ring region (17) adjacent to the oblique surface (12) in the axial direction, which is situated further from the retaining projecting elements (8) than from the oblique surface (12) when in use, and on which a cross perforation (15) for a cross pin (16) is located.

* * * * *